(12) United States Patent
Yennie et al.

(10) Patent No.: US 12,179,525 B2
(45) Date of Patent: Dec. 31, 2024

(54) TIRE ASSEMBLY WITH CIRCUMFERENTIAL SHAPE MEMORY ALLOY CONFIGURATION

(71) Applicant: The SMART Tire Company, Inc., Akron, OH (US)

(72) Inventors: Brian Yennie, Upland, CA (US); Earl Cole, Studio City, CA (US); Jim Benzing, North Canton, OH (US)

(73) Assignee: THE SMART TIRE COMPANY, INC., Akron, OH (US)

( * ) Notice: Subject to any disclaimer, the term of this patent is extended or adjusted under 35 U.S.C. 154(b) by 0 days.

(21) Appl. No.: 18/390,316

(22) Filed: Dec. 20, 2023

(65) Prior Publication Data
US 2024/0116313 A1     Apr. 11, 2024

Related U.S. Application Data

(63) Continuation-in-part of application No. 17/946,402, filed on Sep. 16, 2022.
(Continued)

(51) Int. Cl.
| | |
|---|---|
| *B60C 7/14* | (2006.01) |
| *B60C 7/06* | (2006.01) |
| *B60C 7/22* | (2006.01) |

(52) U.S. Cl.
CPC ............... *B60C 7/14* (2013.01); *B60C 7/06* (2013.01); *B60C 7/22* (2013.01); *B60C 2200/04* (2013.01); *B60C 2200/12* (2013.01)

(58) Field of Classification Search
CPC .... B60C 7/06; B60C 7/14; B60C 7/22; B60C 7/24; B60C 2001/0091
See application file for complete search history.

(56) References Cited

U.S. PATENT DOCUMENTS

| | | | |
|---|---|---|---|
| 4,391,318 | A | 7/1983 | Maxey |
| 6,237,663 | B1 | 5/2001 | Cipparrone |

(Continued)

FOREIGN PATENT DOCUMENTS

| | | |
|---|---|---|
| CA | 1113367 A | 12/1981 |
| EP | 0629652 A1 | 12/1994 |

(Continued)

OTHER PUBLICATIONS

International Search Report and Written Opinion issued in PCT/US22/43787.

(Continued)

*Primary Examiner* — Kip T Kotter
(74) *Attorney, Agent, or Firm* — Jeffer Mangels; Butler & Mitchell LLP; Brennan C. Swain, Esq.

(57) ABSTRACT

A tire assembly that includes a tread portion, a rim, and at least a first band assembly positioned between the tread portion and the rim. The first band assembly includes a first SMA element having an outer surface and a first bead member having an outer surface. The first SMA element extends circumferentially about the tire assembly and the first bead member extends circumferentially about the tire assembly. The first band assembly also includes a plurality of fiber reinforcement members. Each of the plurality of fiber reinforcement members extend around the outer surface of the first SMA element and the outer surface of the first bead member to form the first band assembly.

13 Claims, 14 Drawing Sheets

Related U.S. Application Data

(60) Provisional application No. 63/435,016, filed on Dec. 23, 2022, provisional application No. 63/244,928, filed on Sep. 16, 2021.

(56) References Cited

U.S. PATENT DOCUMENTS

| | | | |
|---|---|---|---|
| 9,416,250 | B2 | 8/2016 | Belin |
| 10,427,461 | B1 | 10/2019 | Padula |
| 10,449,804 | B1 | 10/2019 | Padula |
| 11,912,078 | B1 * | 2/2024 | Creager ............... B60C 7/06 |
| 2001/0012558 | A1 | 8/2001 | Cipparrone |
| 2002/0157750 | A1 | 10/2002 | Riva |
| 2008/0202637 | A1 * | 8/2008 | Hector ............... C09K 13/04 |
| | | | 148/281 |
| 2009/0315696 | A1 | 12/2009 | Browne |
| 2012/0048440 | A1 | 3/2012 | Lettieri |
| 2013/0298548 | A1 | 11/2013 | Chen |
| 2022/0227167 | A1 | 7/2022 | Anderfaas |
| 2022/0324253 | A1 | 10/2022 | Rimai |

FOREIGN PATENT DOCUMENTS

| | | |
|---|---|---|
| EP | 2576212 B1 | 4/2013 |
| JP | 04362401 A * | 12/1992 |
| WO | 2021120624 A1 | 6/2021 |
| WO | 2022056098 A1 | 3/2022 |

OTHER PUBLICATIONS

Lohse et al. "Hinged Adaptive Fiber-Rubber Composites Driven by Shape Memory Alloys—Development and Simulation" materials, vol. 15 Issue 11 (May 27, 2022); pp. 1-20; entire document, but especially: abstract, p. 5 para 4, table 1, p. 7 para 2, fig. 3, fig. 4.

Lohse et al. "Experimental and Numerical Analysis of the Deformation Behavior of Adaptive Fiber-Rubber Composites with integrated Shape Memory Alloys" materials, vol. 15 Issue 2 (Jan. 13, 2022); pp. 1-23; entire document, but especially: abstract, p. 5 para 3, fig. 5.

International Search Report and Written Opinion issued in PCT/US2023/085121.

* cited by examiner

TIRE ASSEMBLY WITH CIRCUMFERENTIAL SHAPE MEMORY ALLOY CONFIGURATION

CROSS-REFERENCE TO RELATED APPLICATIONS

This application is a continuation-in-part of U.S. patent application Ser. No. 17/946,402, filed Sep. 16, 2022, which claims the benefit of U.S. Provisional Application No. 63/244,928, filed on Sep. 16, 2021. This application also claims the benefit of U.S. Provisional Application No. 63/435,016, filed on Dec. 23, 2022. All applications listed above are incorporated by reference herein in their entireties.

FIELD OF THE INVENTION

The present invention relates to shape memory alloys ("SMAs"), particularly to SMAs being structurally combined with polymers to be used in various applications.

BACKGROUND OF THE INVENTION

The prior art primarily focuses on the combination of steel with vulcanized rubber (e.g., as used in tires). Bonding of steel with rubber is a common yet specific process that involves brass-coating the steel and vulcanizing the rubber in the presence of sulfur compounds to create a unique chemical bond, and relies on a strong bond between the steel and the brass. U.S. Pat. No. 4,391,318 is incorporated by reference herein in its entirety. EPO Patent No. EP2576212B1 is also incorporated by reference herein in its entirety.

SMAs are metals having unique properties compared to other metals. SMAs have a pseudoelasticity that allows for an order of magnitude greater recoverable strain than steel. The unique chemistry and material properties of SMAs (e.g., nickel titanium ("NiTinol") provides advantages such as high elasticity and strength. SMAs have a lower stiffness than steel, and thus may be utilized for their elastic properties while steel is generally used for reinforcement in similar applications. As such, improvements in the art utilizing advantages derived from material properties of SMAs are desirable.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention there is provided a tire assembly that includes a tread portion, a rim, and at least a first band assembly positioned between the tread portion and the rim. The tread portion may generally be the outer circumference of the tire assembly and the rim or rim portion is generally the inner circumference. The band assembly or assemblies are positioned therebetween. The first band assembly includes a first SMA element having an outer surface and a first bead member having an outer surface. The first SMA element extends circumferentially about the tire assembly and the first bead member extends circumferentially about the tire assembly. The first band assembly also includes a plurality of fiber reinforcement members. Each of the plurality of fiber reinforcement members extend around the outer surface of the first SMA element and the outer surface of the first bead member to form the first band assembly.

The present invention includes the use of SMAs in combination with polymers to create structures with combined properties of elasticity and strength as well as bonding, encapsulating, and encasing SMA elements in a polymer. SMA structures are combined with polymers to create structures that have both high elasticity and strength without the need for a pneumatic element (in the case of tires, pressurized air). In a preferred embodiment, the present invention is a toroidal SMA structure encapsulated in polyurethane or another polymer that is bonded to a rubber tread to form an airless tire with properties similar to a pneumatic tire.

A preferred embodiment is embodied in an SMA assembly. The SMA assembly includes and SMA structure. The SMA structure is encased in a polymer. The SMA structure includes an SMA element.

This and other embodiments may optionally include the following. The SMA element may include at least one of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β-Ti alloys, ternary alloys, or quaternary alloys of a material of the SMA element. The SMA element may be a wire, sheet, spring, or foam.

The SMA element may be multiple SMA elements. The SMA elements may be mechanically combined. The multiple SMA elements may include multiple springs that may be interwoven with each other. The multiple SMA elements may include a spring and a wire. The spring and the wire may be interwoven with each other. The multiple SMA elements may be arranged to form a helical or toroidal shape.

The polymer may be one of natural rubber, synthetic rubber, vulcanized rubber, polyurethane, nylon, acrylic, or another thermoset or thermoplastic polymer. The polymer may be 3D printed onto the SMA structure.

The SMA assembly may further include an outer and nearly monomolecular microporous metal coating that may be disposed over the SMA element. The coating may be selected from at least one of zirconium, cerium, lanthanum, nickel, cobalt, tin, titanium, zinc, copper, brass, and bronze plated. The SMA assembly may further include a second layer of coating configured to be disposed over the SMA element. The second layer of coating may include the same one or more materials of the outer coating or one or more materials different than those of the outer coating. The SMA assembly may further include a benzotriazole or another corrosion inhibitor configured to be applied to the SMA element.

The SMA element may be an SMA wire. The SMA wire may be used as a core of a drawn filled tube. The drawn filled tube may include a sheathing material. The sheathing material may include a metal or a polymer. The SMA element may bond to the polymer via a vulcanizing adhesive, solvent-based adhesive, water-based adhesive, or epoxy. The polymer may be a first polymer bonded to a second polymer. The first polymer and the second polymer may be different materials from each other.

The SMA assembly may further include a prepolymer or a resin. The prepolymer or the resin may be applied to the SMA element via a pre-formed mold and a curing process. The curing process may include rotational molding, rotational casting, spin casting, injection molding, extrusion, blow molding, thermoforming, expanded bead foam molding, or extruded foam molding.

Another preferred embodiment is embodied in a tire assembly. The tire assembly includes a body defined by an SMA structure. The SMA structure includes an SMA element. The tire assembly further includes a polymer layer. The polymer layer is configured to encase the body.

Yet another preferred embodiment is embodied in an SMA assembly. The SMA assembly includes an SMA structure. The SMA structure includes a first spring and a second spring interwoven with each other. The first spring has a larger diameter than a diameter of the second spring. The SMA has a toroidal shape. The SMA assembly further includes a polymer layer configured to encase the SMA structure.

It will be appreciated that the inventive tire assembly improves load carrying capacity and long life as compared to conventional pneumatic tires and steel spring tires. The present invention enables superior load carrying, vehicle integration, manufacturability, and tire performance for the non-pneumatic superelastic tire.

In another preferred embodiment of the present invention, the SMA elements or wires can be configured as circumferentially wrapped SMA elements within the tire-tread wall. The SMA elements may be attached or secured to the tire rim/bead through reinforcements (e.g., fiber reinforced polyester), cords, strands or the like. This attachment helps restrict outer diameter growth of the SMA elements during loading, creating a semi-rigid body to distribute the load around the tire.

The present invention provides improved load carrying capacity and long life as compared to conventional pneumatic tires and steel spring tires. The present invention enables superior load carrying, vehicle integration, manufacturability, and tire performance for the non-pneumatic superelastic tire.

In one preferred embodiment of the present invention, the SMA elements or wires can be configured in or as a radially stiffened spring configuration. In the present invention and another preferred embodiment, the SMA elements or wires can be configured as circumferentially wrapped or arranged SMA elements within the tire-tread wall.

In a preferred embodiment, the SMA elements are attached or secured to the tire rim or bead through reinforcements (e.g fiber reinforced polyester) that extend between the SMA elements and the tire rim and/or bead. This attachment helps to restrict the outer diameter growth of the SMA elements during loading, creating a semi-rigid body to distribute the load around the tire.

It should be understood that the phrase "extends circumferentially" or similar language does not necessarily mean that a component extends around the outer boundary of the entire tire assembly, but that the component extends generally circularly around the tire assembly (e.g., in the rolling direction), as is best shown in FIG. 12.

DETAILED DESCRIPTION OF THE PREFERRED EMBODIMENTS

Figure 1:
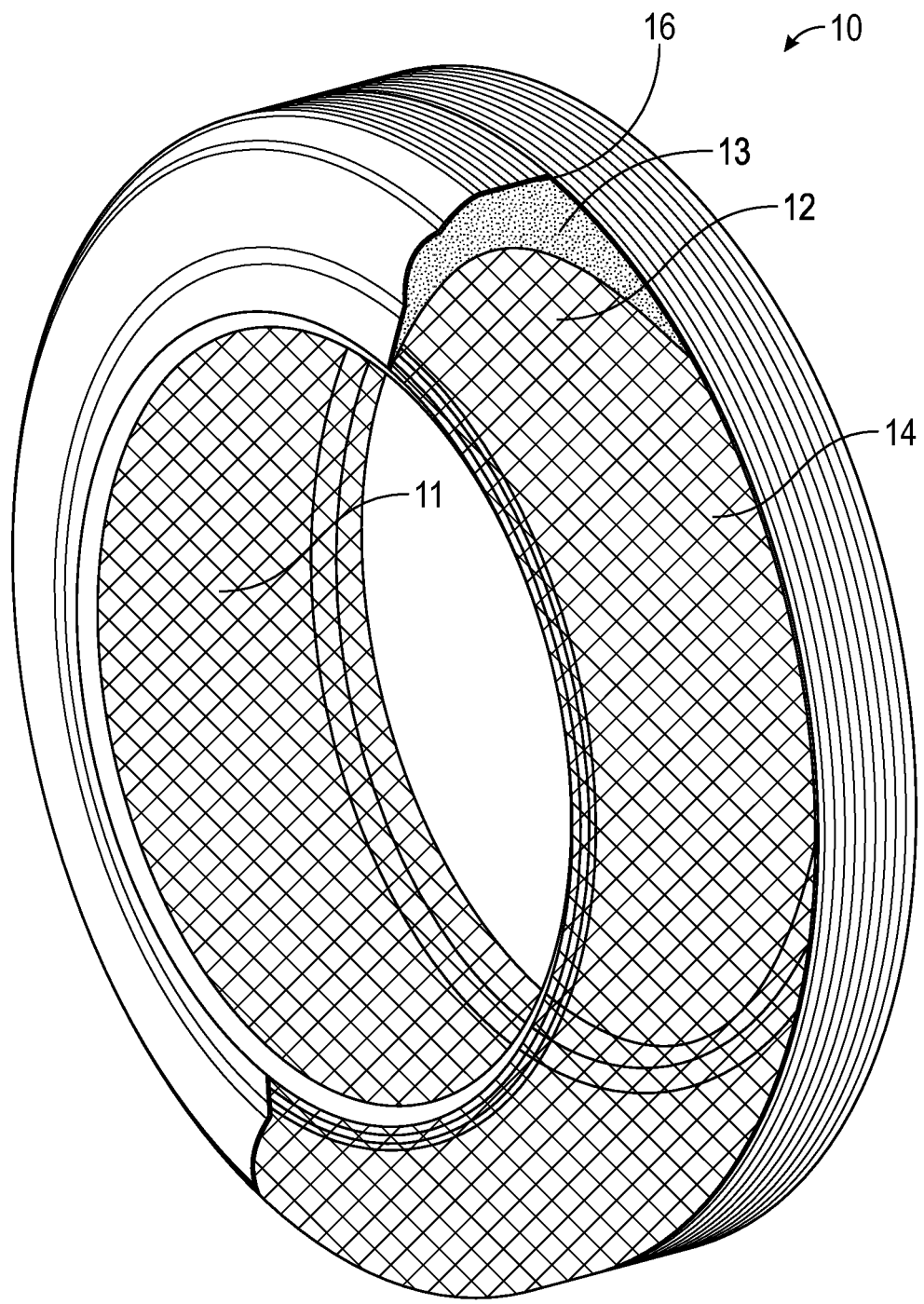
FIG. 1 is a perspective view of a tire assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward" and "below" used herein are merely for ease of description and refer to the orientation of the components as shown in the figures. It should be understood that any orientation of the components described herein is within the scope of the present invention.

The figures are generally directed to a tire assembly 10. In some embodiments, the tire assembly 10 may instead be characterized as an SMA assembly that may be used for other purposes where air or pneumatic pressure would otherwise be used within a polymer structure. Since the tire assembly 10 is functional without air or pneumatic pressure, use of the tire assembly 10 is advantageous in rugged terrain where conventional tires are prone to flats and environments where air is lacking or not present (e.g., space, other planets, moons, etc.). In addition to enhanced durability, the tire assembly 10 advantageously provides lower rolling resistance than pneumatic tires, which contribute to greater fuel efficiency in vehicles. The use of the SMA assembly as the tire assembly 10 is only exemplary and is not a limitation on the present invention. In a preferred embodiment, the SMA tire assembly 10 generally includes a toroidal SMA structure 12 encapsulated in a polymer member or structure 14 (such as polyurethane) and then bonded to a polymer outer tread 16. It will be appreciated that the SMA structure 12 may be other enclosed or unenclosed shapes, such as tubular, spherical, helical etc.

FIG. 1 is a perspective view of the tire assembly 10. The tire assembly 10 may be shaped and sized for various use including but not limited to automobiles, bicycles, aircraft, motorcycles, and, scooters. The tire assembly 10 may have a recessed or indented inner surface 11. The recess or indentation of the inner surface 11 may allow the tire assembly 10 to be mated with a wheel or a rim 18 to then be attached to a vehicle. The tire assembly 10 may include the SMA structure 12 and the polymer member 14. The SMA structure 12 is shown in FIG. 1 as a spring toroid encased with a polymer (e.g., rubber) outer tread 16 to form an airless tire. The The SMA structure 12 may include SMA elements. The SMA elements may collectively form the SMA structure. In some examples, the SMA elements may be uniform in size, shape, and/or material properties. In some examples, the SMA elements may be different than each other in size, shape, and/or material properties. For example, an SMA element may be a wire, a spring, a sheet, a fiber, foam, and/or the like. The SMA element may include one or more of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β-Ti alloys, or ternary alloys or quaternary alloys of a material of the SMA element. The SMA elements may be attached together to form the SMA structure 12. For example, the SMA elements may be interwoven with each other.

The polymer outer tread 16 may be disposed over the SMA structure 12. The polymer outer tread 16 may enclose an outer surface 13 of the SMA structure 12. The polymer outer tread 16 may be rubber and/or another material having similar properties to rubber. The polymer outer tread 16 may have protrusions, bumps, threads, grooves, channels, cavities, and/or the like to provide additional grip.

Figure 2:
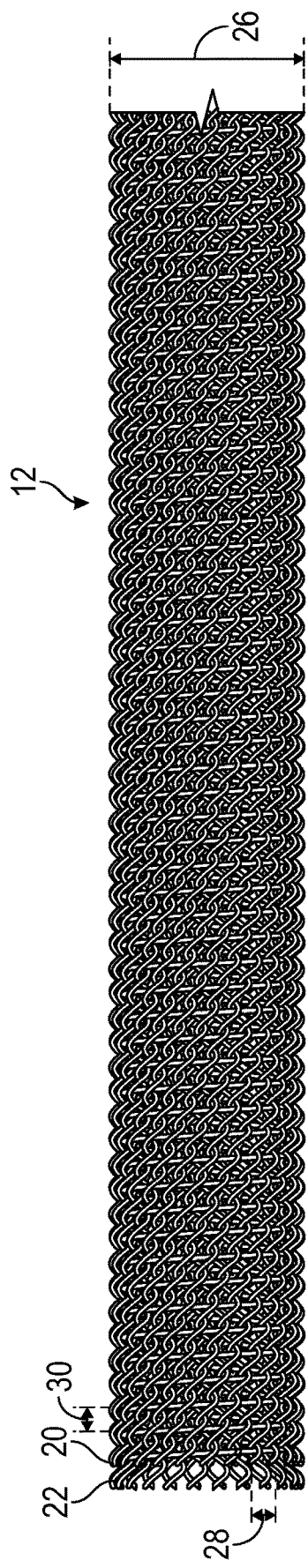
FIG. 2 is a sectional view of the tire assembly of FIG. 1 isolating SMAs in accordance with a preferred embodiment of the present invention.
Figure 3:
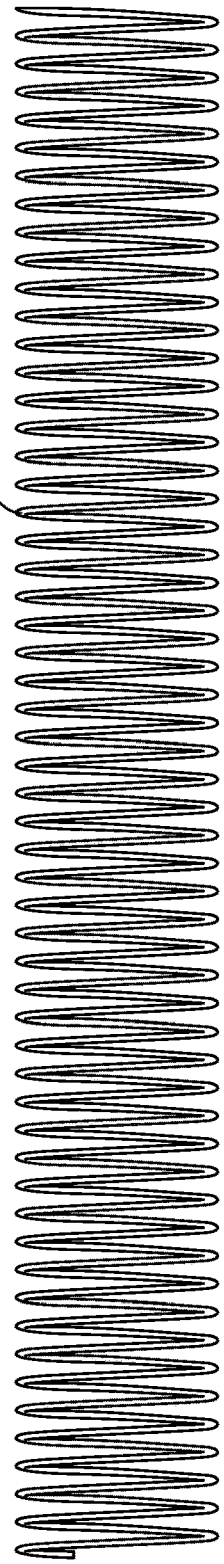
FIG. 3 is a sectional view of the tire assembly of FIG. 1 isolating a first SMA element in accordance with a preferred embodiment of the present invention.
Figure 4:
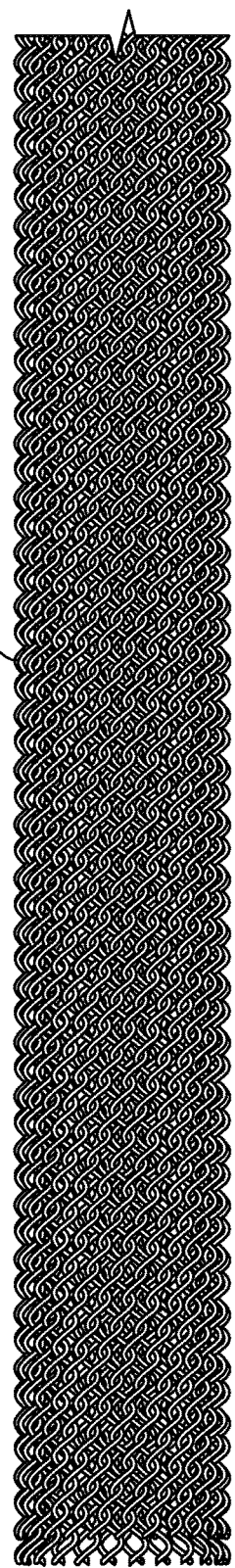
FIG. 4 is a sectional view of the tire assembly of FIG. 1 isolating a second SMA element in accordance with a preferred embodiment of the present invention.
Figure 5:
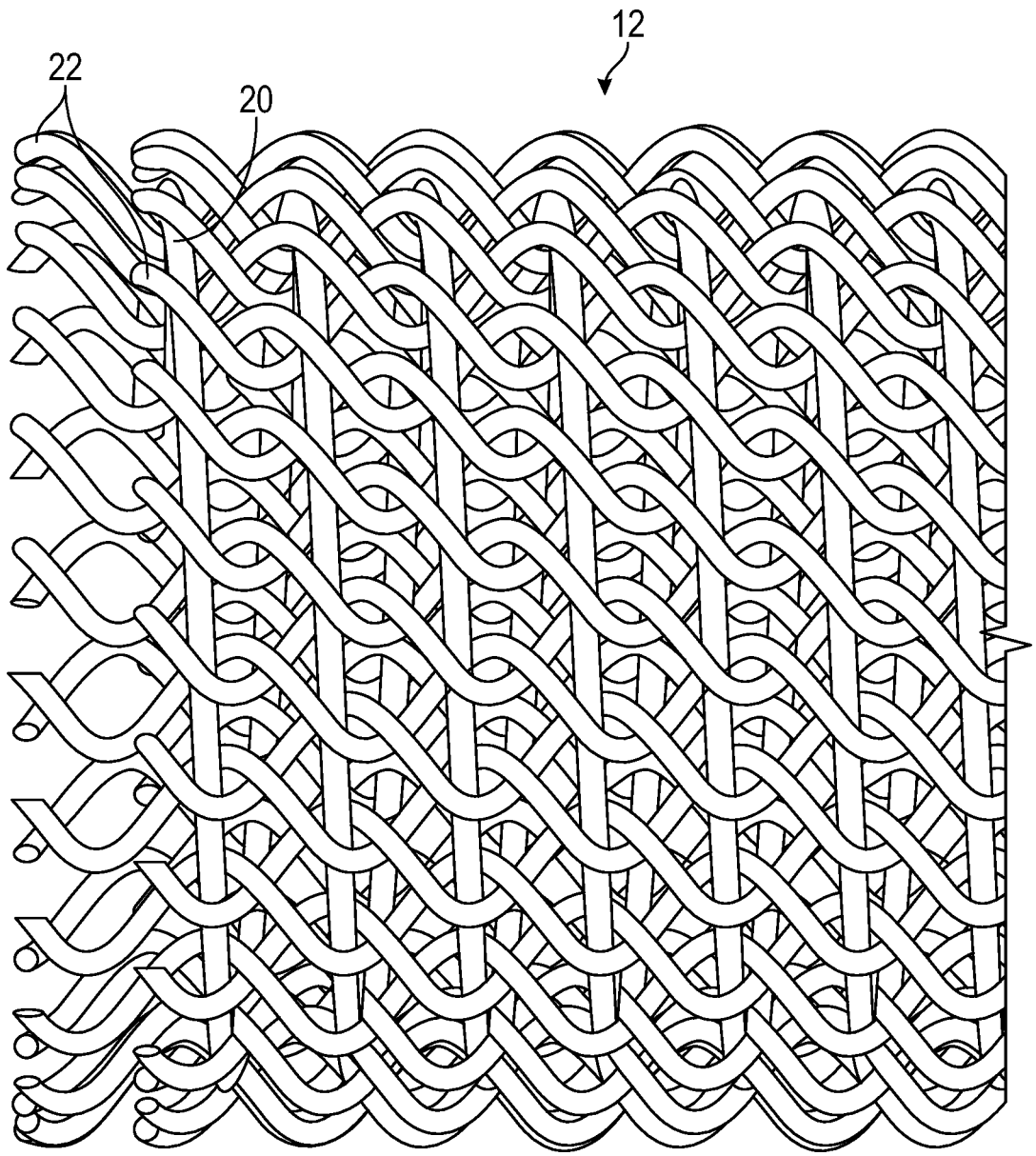
FIG. 5 is a magnified view of the SMAs of the tire assembly of FIG. 1 in accordance with a preferred embodiment of the present invention.

FIG. 2 is a sectional view of the SMA structure 12. The SMA structure 12 includes a first spring 20 and a second spring 22. FIG. 3 is a sectional view of the first spring 20. FIG. 4 is a sectional view of multiple interwoven second springs 22. In some examples, the first spring 20 and/or second spring 22 may be replaced with a wire, sheet, fiber, or foam. Referring back to FIG. 2, the second spring 22 may be woven or threaded around the first spring 20 along a length of the first spring 20 in the directions of the arrows 24. There may be multiple second springs 22 woven or threaded around the first spring 20. The second springs 22 may also be woven or threaded around each other. FIG. 5 is a magnified view of the SMA structure 12 showing the connection between the first spring 20 and the second springs 22. Referring back to FIG. 2, the first spring 20 may have a first diameter 26. The second spring 22 may have a second diameter 28. The first diameter 26 may be greater than the second diameter 28. The second springs 22 may be disposed around an entirety of the first diameter 26. The second springs 22 being connected to the first spring 20 as shown in FIG. 2 maintains a pitch 30 of the first spring 20 constant. Prior to assembling the first spring 20 and the second springs together 22, the pitch 30 may be varied to render the tire assembly 10 (see FIG. 1) harder or softer.

In some examples, the SMA structure 12 may include or have an outer, thin, practically or nearly monomolecular microporous metal coating thereof selected from at least one of zirconium, cerium, lanthanum, nickel, cobalt, tin, titanium, zinc, copper, brass and/or bronze plated. In some examples, a second layer of coating (of any of the materials described above) may be applied, using the same or a different metal. In some examples, a benzotriazole or another corrosion inhibitor may be applied to the SMA structure 12.

In some examples, a prepolymer or resin may be applied to the SMA structure 12 by using a pre-formed mold and a curing process. In some examples, the curing process may include rotational molding, rotational casting, spin casting, injection molding, extrusion, blow molding, thermoforming, expanded bead foam molding, or extruded foam molding.

Figure 6:
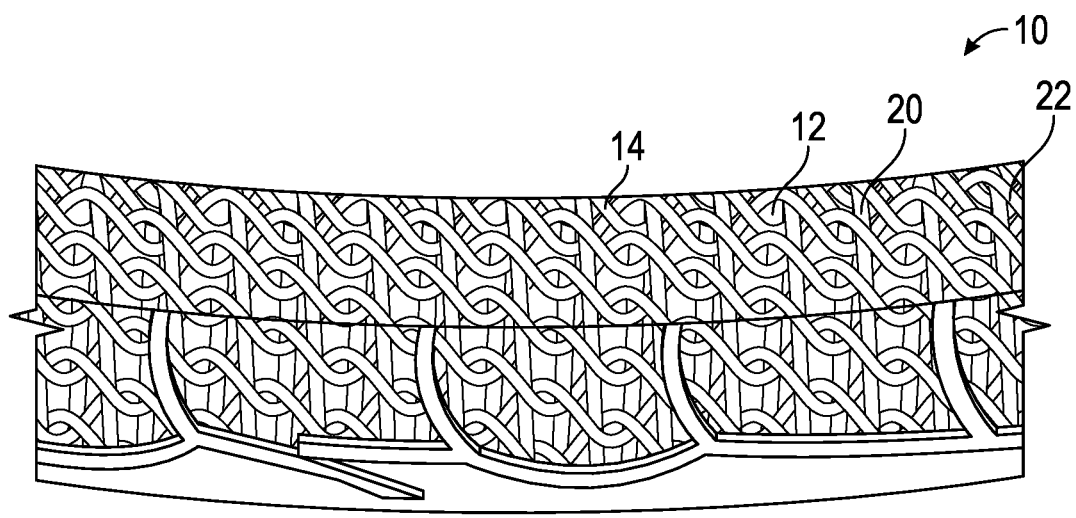
FIG. 6 is a sectional view of the TIRE assembly of FIG. 1 showing SMAs encapsulated in a polymer in accordance with a preferred embodiment of the present invention.

FIG. 6 is a sectional view of the tire assembly 10 showing the SMA structure 12 encapsulated in the polymer member 14. The polymer member 14 may be disposed between the first spring 20 and the second springs 22 such that the space defined by the first diameter 26 (see FIG. 2) remains hollow. Any polymer is within the scope of the present invention. For example, the polymer member 14 may be one of natural rubber, synthetic rubber, vulcanized rubber, polyurethane, nylon, acrylic, or another thermoset or thermoplastic polymer.

In some examples, the polymer member 14 may be 3D printed or additively manufactured onto the SMA structure 12. In some examples, the SMA structure 12 may be bonded to the polymer member 14 using a vulcanizing adhesive, solvent-based adhesive, water-based adhesive, or epoxy. For instance, Chemlok® may be used to bond the SMA structure 12 and the polymer member 14 together.

Figure 7:
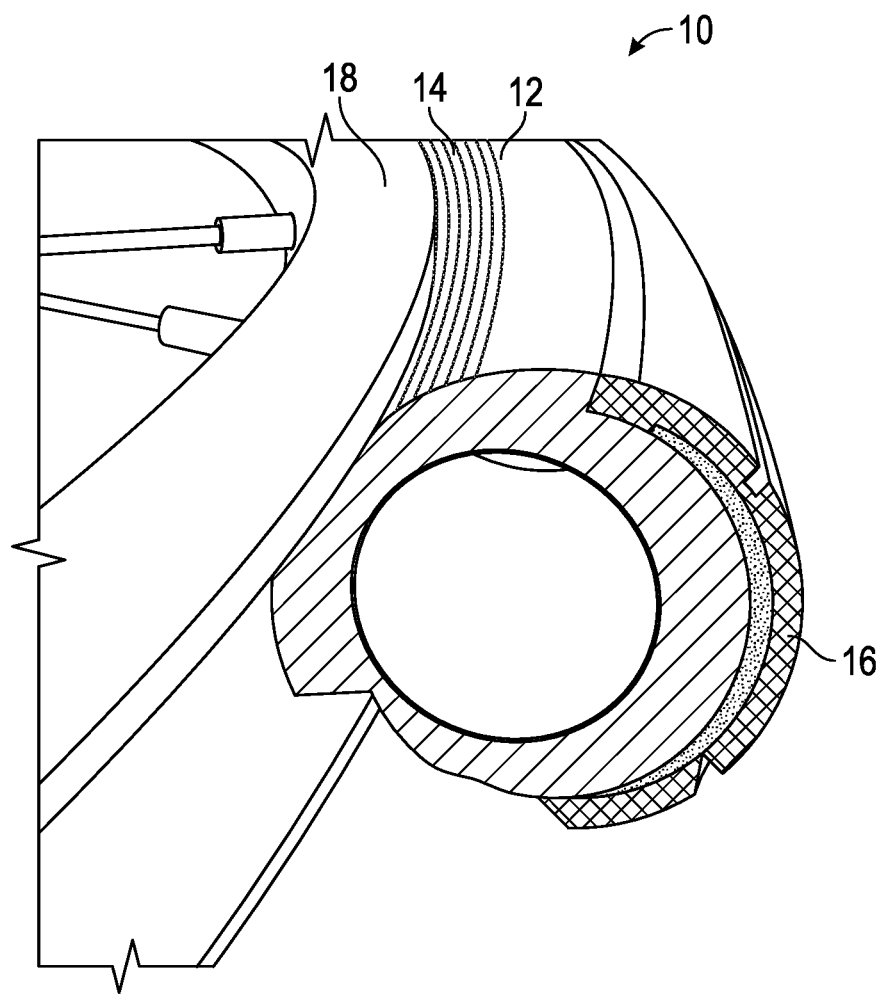
FIG. 7 is a cross-sectional view of the tire assembly of FIG. 1 showing SMAs encapsulated in multiple layers of polymers in accordance with a preferred embodiment of the present invention.

FIG. 7 is a cross-sectional view of the tire assembly 10 showing the SMA structure 12 encapsulated by the polymer member 14 as well as the polymer outer tread 16. The polymer outer tread 16 may provide additional reinforcement to the tire assembly 10. The polymer outer tread 16 may be bonded directly to the polymer member 14. The polymer material or materials of the polymer member 14 may be different than those of the polymer outer tread 16. It will be appreciated that the polymer outer tread 16 may entirely cover the polymer member 14 and the SMA structure 12.

Figure 8:
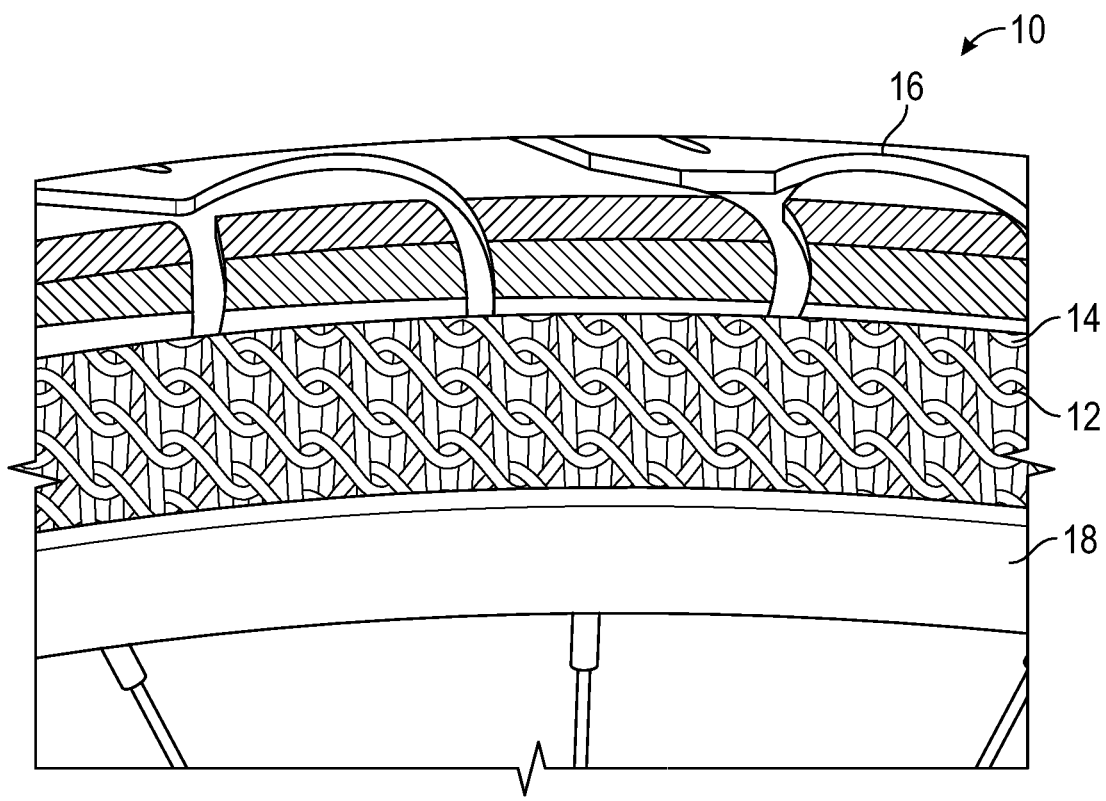
FIG. 8 is a side view of the tire assembly of FIG. 7 in accordance with a preferred embodiment of the present invention.
Figure 9:
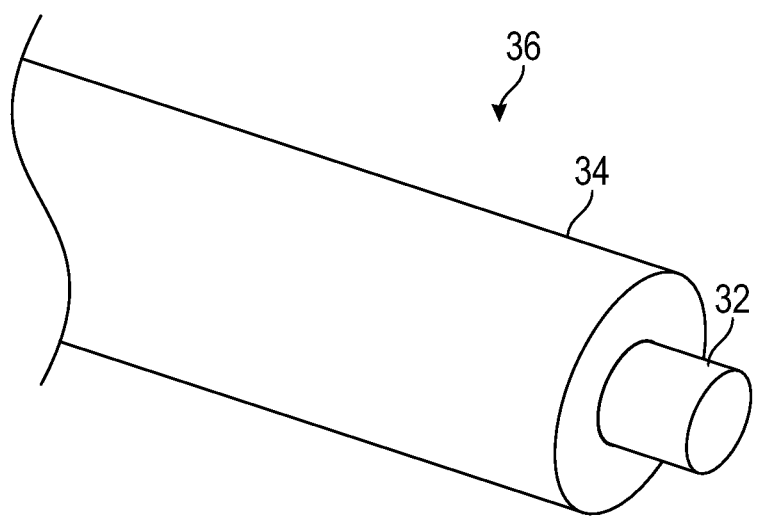
FIG. 9 is a cut-off perspective view of a SMA element under a layer of sheathing material in accordance with a preferred embodiment of the present invention.

FIG. 8 is a side view of the tire assembly 10. The polymer outer tread 16 may partially cover the polymer member 14 and the SMA structure 12 as shown in FIG. 8. In some examples, the polymer outer tread 16 may not be enclosing the polymer member 14 and the SMA structure 12 at or near mating surfaces of the rim 18 and the tire assembly 10. A bicycle rim is shown in FIG. 8 by example. FIG. 9 is a cut-off perspective view of an SMA wire 32 under a layer of sheathing material 34. The SMA wire 32 may be utilized in lieu of the first spring 20 (see FIG. 5) and/or the second spring 22 (see FIG. 5) to form an SMA structure. The SMA wire 32 may be used as a core of a drawn filled tube 36. The drawn filled tube 36 may include the sheathing material 34. The sheathing material 34 may be a metal or a polymer. In some examples, the sheathing material 34 may be same as the material of the polymer member 14 (see FIG. 8) and/or the polymer outer tread 16 (see FIG. 8). In some examples, the sheathing material 34 may be same as the material of the SMA wire 32.

FIGS. 10-17 show another embodiment of the present invention where the tire assembly 50 includes or incorporates SMA elements 52 that are configured in a circumferentially extending configuration with attachments (e.g., semi-rigid attachments) to the rim and/or beads or bead members. The tire assembly 50 may be used with any type of vehicle, but is preferably used with a bicycle, automobile or the like. In a preferred embodiment, the tire assembly is used with existing hardware (e.g., rim, etc.), however, this is not a limitation on the present invention.

Figure 11:
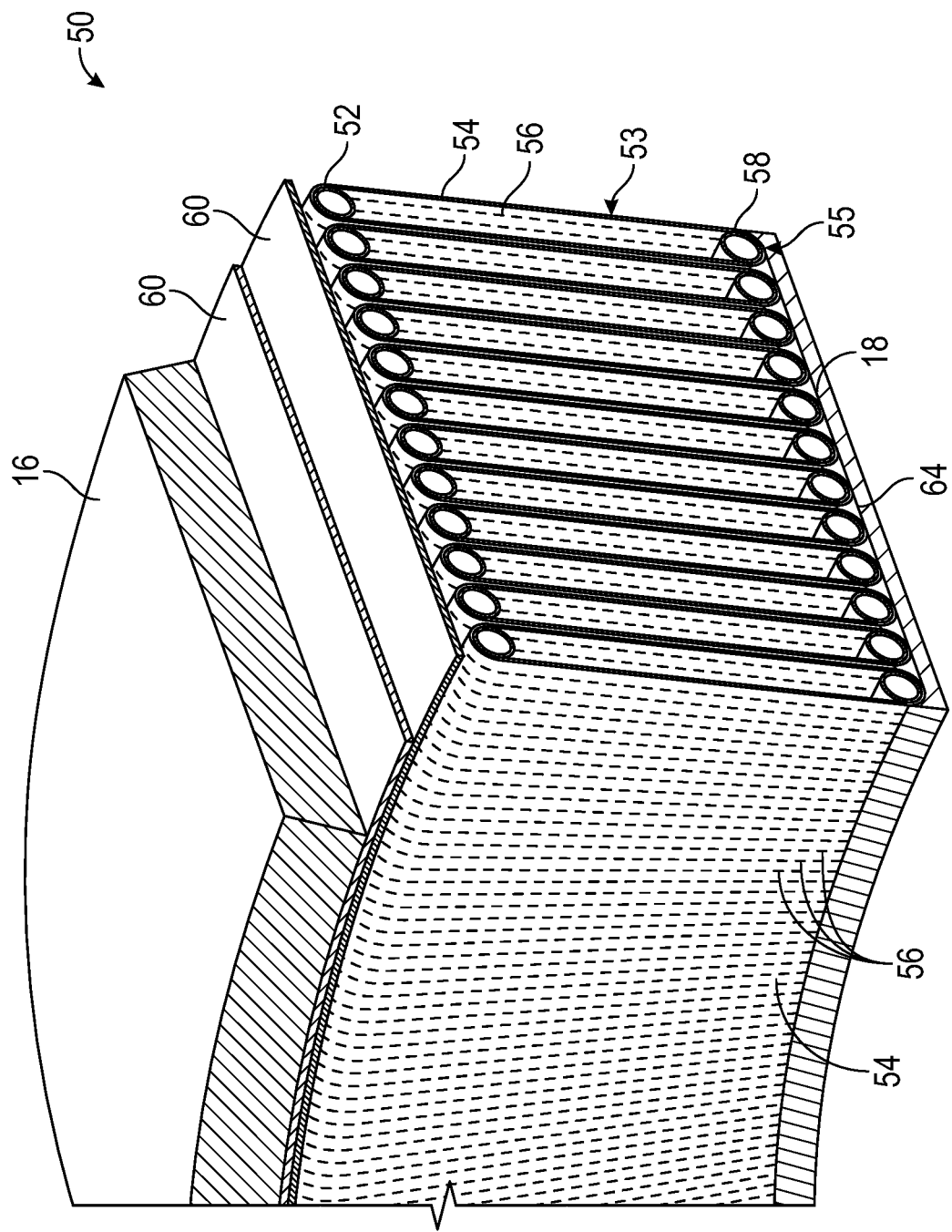
FIG. 11 is a perspective view of a portion of the tire assembly of FIG. 10 with portions in cross-section.
Figure 12:
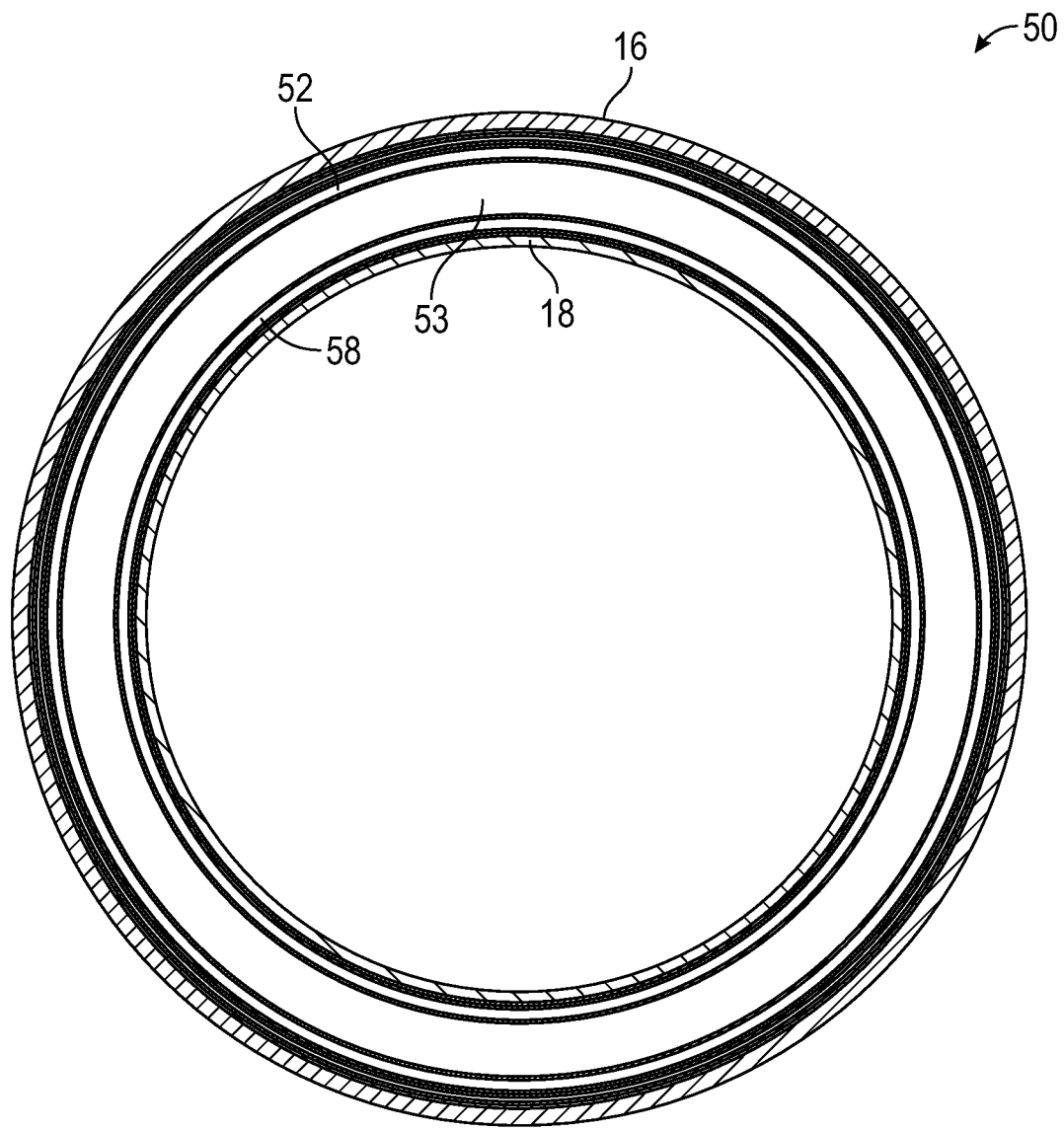
FIG. 12 is a side elevational cross-sectional view of the tire assembly.

As shown in FIG. 11-12, in a preferred embodiment, the tire assembly 50 may include a number of interrelated and interacting components, including the circumferential SMA elements 52 (which may include any cross-sectional shape), polymer member or polymer ply member 54 that includes the fibers 56 as reinforcements therein (referred to as fiber reinforcements 56), one or more belts 60, tire beads or bead members 58 and the tread 16. In a preferred embodiment, the polymer member 54 is configured in a band with the fiber reinforcements 56 therein and may be referred to herein as a fiber reinforced polymer assembly 53. The fiber reinforced polymer assembly 53 together with the outer circumferential SMA elements 52 and inner circumferential bead members 58 may be referred to herein as a ply or band assembly 55. The SMA elements 52 may be tubular, shape set and welded. However, this is not a limitation on the present invention. The SMA elements may include any cross-sectional shape, such as tubular (FIG. 13), U-shaped (FIG. 14), semi-circular, I-beam, non-hollow circular or any other desired shape. The fiber reinforcements may be SMA elements, Kevlar, nylon, polyester or similar material or chord and as may be known in the tire industry and embedded within the polymer 54 (similar to polymer 14), which may be rubber, polyurethane, polymer or the like. None of the materials discussed herein are limitations on the present invention. The tire beads 58 may be a series of circumferentially extending welded tubes made of a metal, such as steel, aluminum, titanium or SMA, for example. The bead members 58 may also be solid wires, cables or may be any cross-sectional shape. The tubes may be received or set in individual circumferentially extending grooves, a plurality of grooves or a single groove 64 (see FIG. 13) in the inner surface of the rim 18. The U-shaped structure shown in FIG. 13 may help with manufacturing of the SMA elements 52 (or bead members) as it may be easier (and cheaper) to use a sheet of SMA that can be rolled into a U-shape cross-section instead of creating a full tube.

As shown in FIG. 11, in a preferred embodiment, the tire assembly 50 includes the tread member or portion 16, rim 18, and at least a first band assembly 55 positioned between the tread portion 16 and the rim 18. The band assembly 55 includes at least a first SMA element 52 having an outer surface 52a and may extend circumferentially about the tire assembly 55, as shown in FIG. 12. The band assembly 55 may also include at least a first bead member 58 having an outer surface 58 and that extends circumferentially about the tire assembly 50. In another embodiment, the inner portion of the band assembly 55 if secured to the rim 18 or other component, as opposed to being wrapped around or extending around the a bead. The tire assembly 50 also may include a plurality of fiber reinforcements or fiber reinforcement members 56. The fiber reinforcement members 56 may extend around the outer surface of the first SMA element 52 and the outer surface of the first bead member 58 to at least partially form the band assembly 55. In an embodiment where individual fiber reinforcement members 56 extend around the SMA element(s) 52 and the bead member 58, the band assembly 55 is formed by the fiber reinforcement members 56 and the SMA element(s) 52 and the bead member 58 (and the polymer is omitted). Preferably, the entire set of the plurality of fiber reinforcement members 56 extend circumferentially about the tire assembly. In other words, each individual fiber reinforcement member 36 extends around at least one SMA element 52 and at least one bead member. However, the individual fiber reinforcement members 56 are positioned adjacent to one another around the circumference, as is best shown in FIG. 11 with the fiber reinforcement members 56 positioned next to each other.

Figure 15:
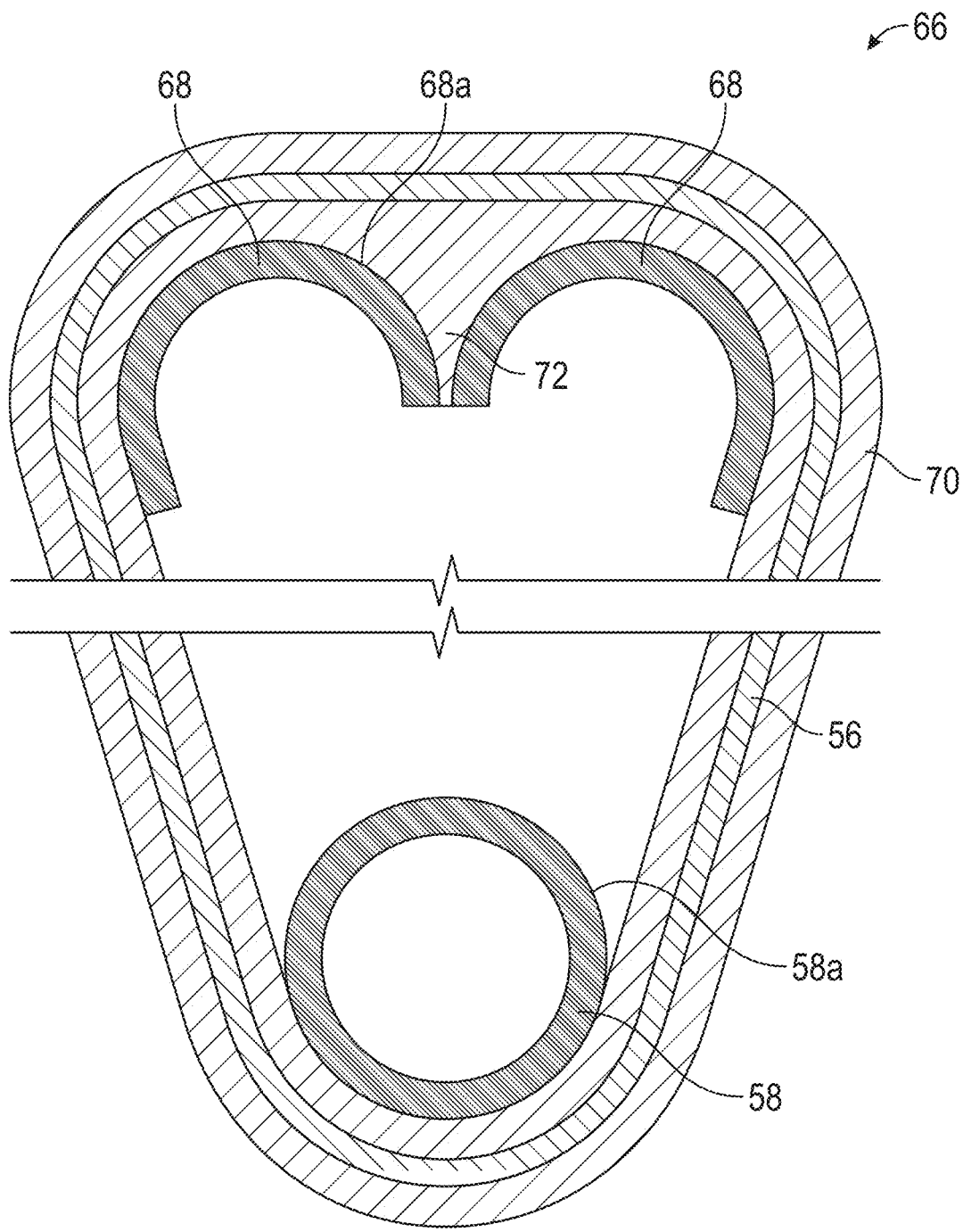
FIG. 15 is a cross-sectional view of a portion of a band assembly.
Figure 16:
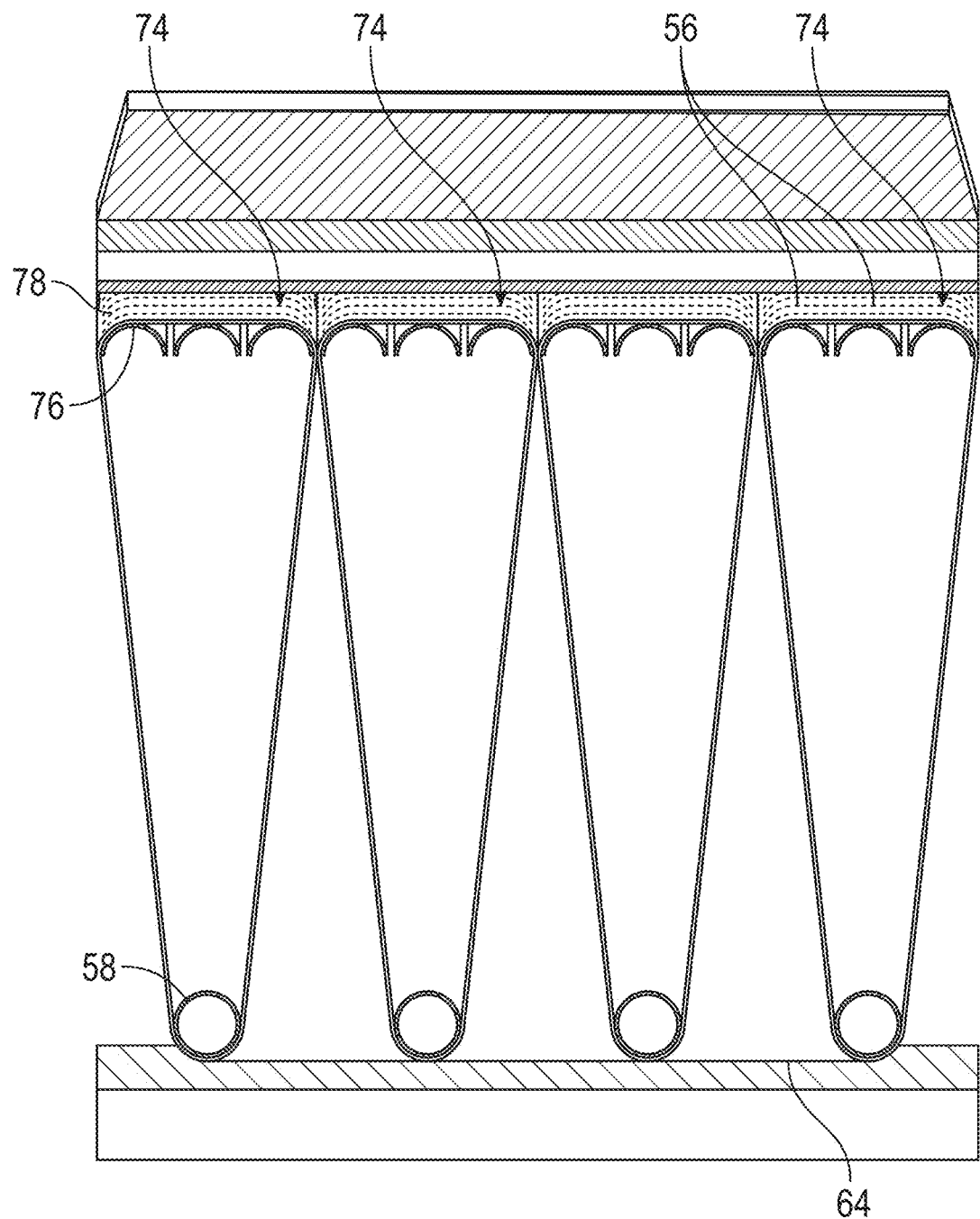
FIG. 16 is a cross-sectional view of a plurality of band assemblies that include three SMA elements and only showing the features on the cut-line of the band assembly.
Figure 17:
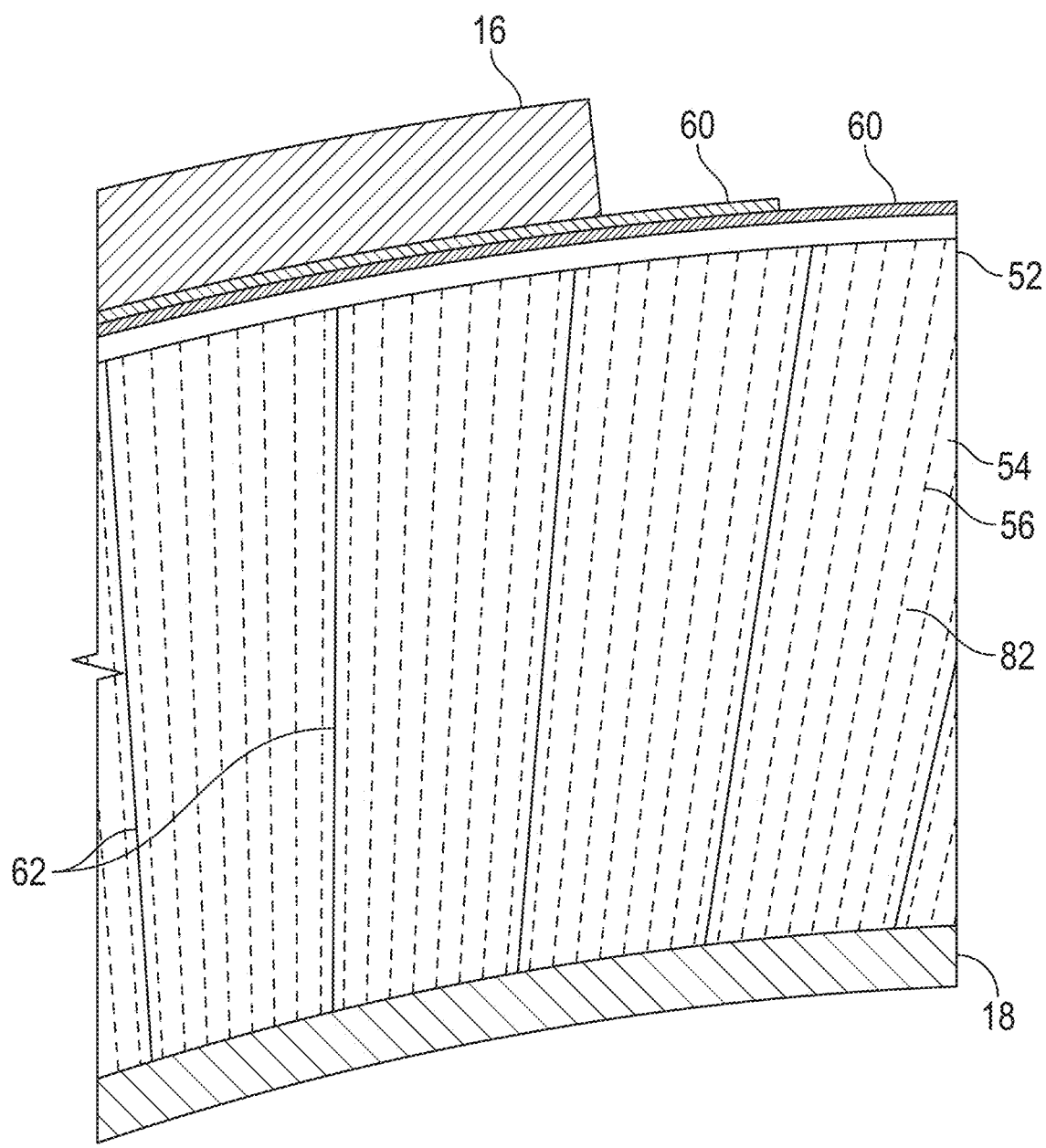
FIG. 17 is a side elevational cross-sectional view of a portion of the tire assembly showing the band assembly including a wrap.

In a preferred embodiment, the plurality of fiber reinforcement members 56 are disposed, embedded, encased or otherwise associated with a polymer ply member 54 to together form the fiber reinforced polymer assembly 53 that extends around the outer surface of the first SMA element 52 and the outer surface of the first bead member 58. As shown in FIG. 11, in an embodiment of the invention, the fiber reinforced polymer assembly 53 may take the form of a tubular configuration that extends circumferentially about the tire assembly. The tubular configuration does not have to be circular, but can be any enclosed configuration, as shown in FIG. 11 or 13-16, etc. In another embodiment, as shown in FIG. 17, instead of a continuous circumferential tube, the fiber reinforced polymer assembly 82 can be formed by a wrap extending around the SMA element(s) 52 on the outside and the bead member(s) 58 on the inside. See the edges 62 of the wrap showing that the wrap is spiraled around the SMA element(s) 52 on the outside and the bead member(s) 58 on the inside. Therefore, the fiber reinforced polymer assembly may comprises a wrapped spiral configuration that extends circumferentially about the tire assembly. The wrap includes the fiber reinforcement members or cords therein, and may be, for example, a one inch wide strip that starts as a roll and is wrapped around the SMA element(s) and bead member(s), during manufacture.

Figure 10:
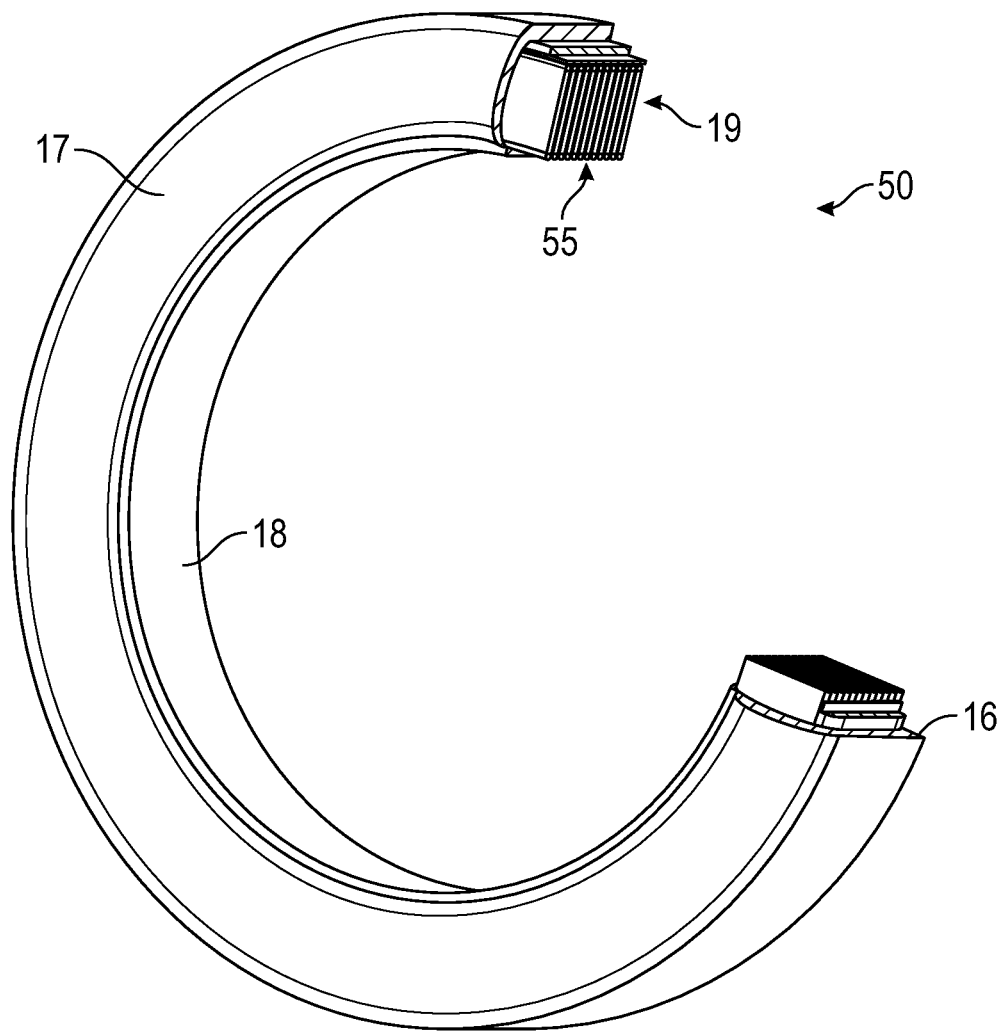
FIG. 10 is a perspective view of a tire assembly with a portion cut away in accordance with a preferred embodiment of the present invention.

FIG. 10 shows the tire assembly 50 with a portion cut away. FIG. 10 also shows the tire assembly 50 with sidewalls 17. For ease of illustrating the inner portion of the tire assembly, the sidewalls are omitted in the other views. However, it will be appreciated that the tire portion of the tire assembly (e.g., the rubber of the tire) may include an outer portion (that includes or is the tread portion 16) and first and second sidewalls 17 that enclose or house the SMA assembly 19 (which includes the one or more laterally adjacent band assemblies 55). It will be appreciated that the tread portion does not have to include actual treads thereon, but is referred to the tread portion herein as it is the portion of the tire that contacts the ground or road. The SMA may include a band, housing, enclosure or structure therearound to hold all the components thereof (e.g., the band assemblies 55) together. FIGS. 11 and 13-16 show close-ups of the fiber reinforced polymer assemblies 53 and the band assemblies 55. In FIG. 11, the fiber reinforced polymer assembly 53 (which includes the fiber reinforcements 56 embedded in the polymer 54) extends around an SMA element 52 at the outer end (at or near the outer circumference of the tire assembly) and around a bead member 58 at the inner end (at or near the inner circumference of the tire assembly), thus forming the band assembly 55. FIG. 12 shows that an SMA element 52 and a bead member 58 extending circumferentially around the tire assembly 50. As shown in FIG. 11, the fiber reinforced polymer assemblies 53 extend around the OD of the SMA elements 52 and the bead members 58. The separate fiber reinforcements 56 within the fiber reinforced polymer assemblies 53 are evident at the top of FIG. 13.

Figure 13:
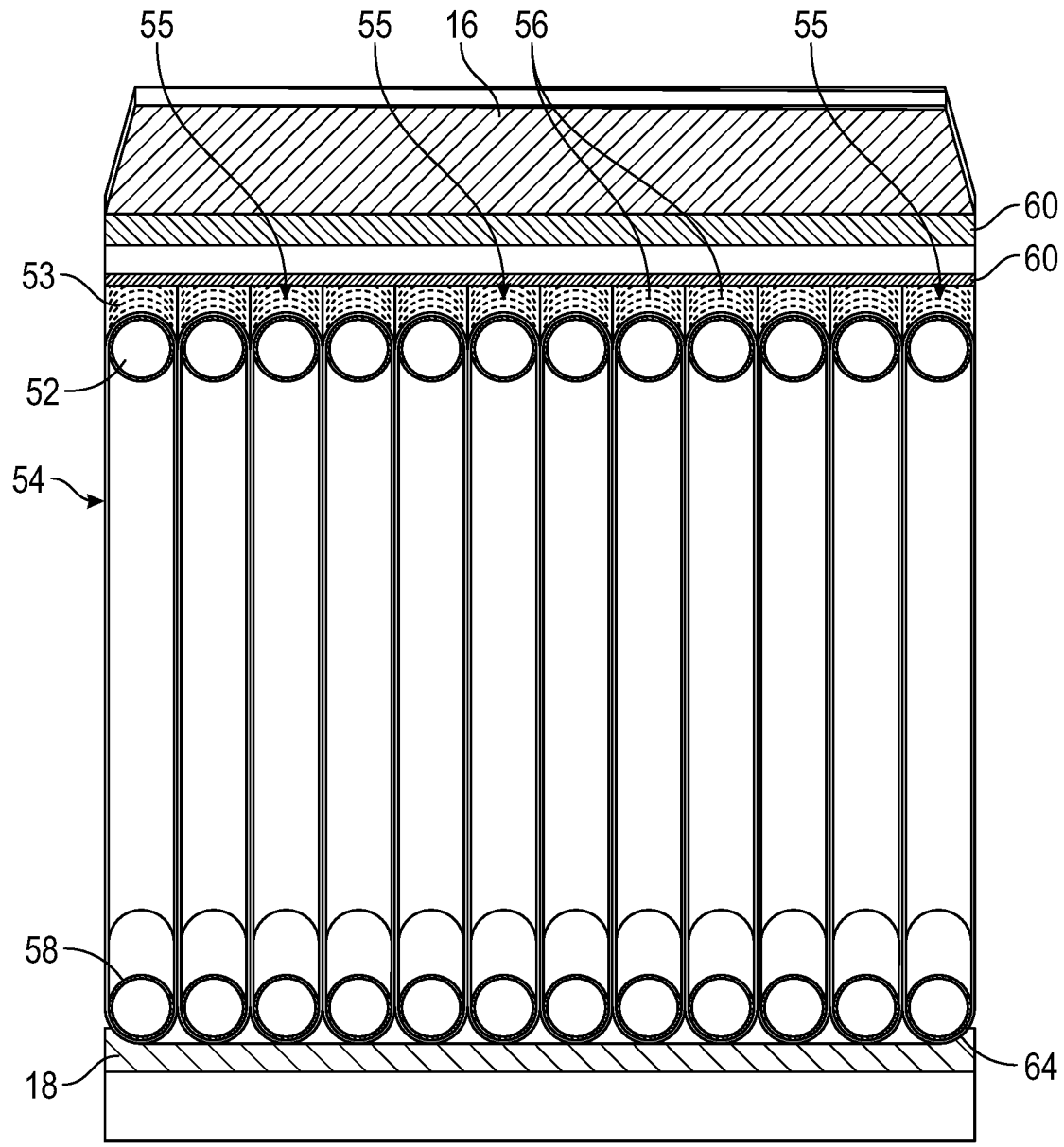
FIG. 13 is a front elevational cross-sectional view of the portion of the tire assembly shown in FIG. 11.

FIGS. 11 and 13 show an exemplary embodiment that includes twelve band assemblies 55 configured laterally to partially form the tire assembly 50. However, this is only exemplary and any number of band assemblies 55 are within the scope of the present invention. In this embodiment, the fiber reinforced polymer assemblies 53 extend vertically from a bead member 58 to the vertically adjacent SMA element 52 or tube. In another embodiment, the fiber reinforced polymer assemblies 53 can extend diagonally or at an angle from a bead member 58 to an SMA element 52 that is not vertically adjacent. For example, when viewing FIG. 13, the fiber reinforced polymer assembly 53 associated with the left-most bead member 58 may extend upwardly to the right at an angle and extend or wrap around the SMA element that is second from the left or any of the other SMA elements that are not directly vertically adjacent thereto. This arrangement can help address lateral forces in the tire assembly when the vehicle goes around a corner. In another embodiment, a fiber reinforced polymer assembly 53 can extend around one or bead members 58 at the ID and one or more SMA elements 52 at the OD. Different arrangements of band assemblies 55 including any number of bead members 58 and any number of SMA elements 52 and at any angle are within the scope of the present invention.

Figure 14:
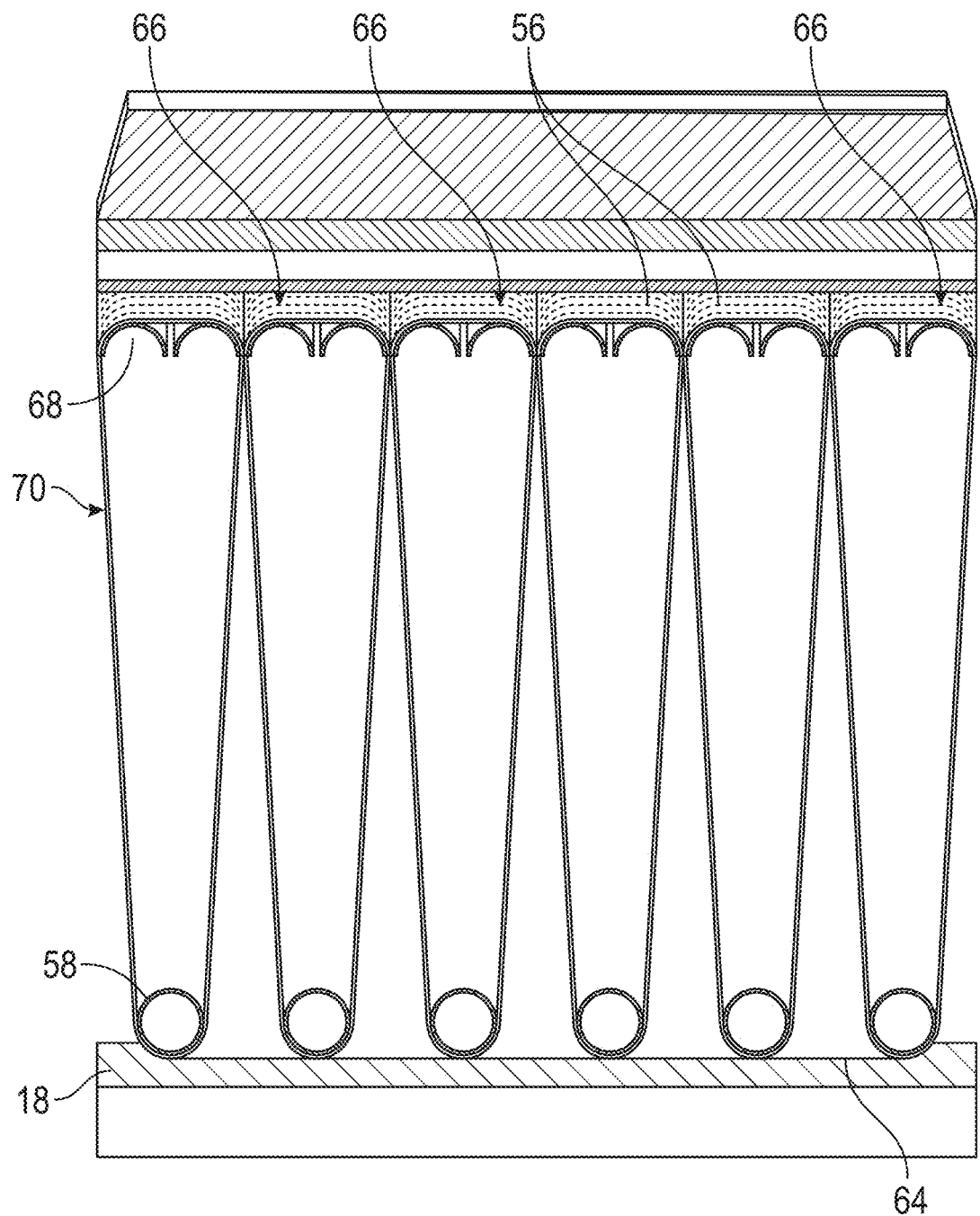
FIG. 14 is a cross-sectional view of a plurality of band assemblies that include two SMA elements and only showing the features on the cut-line of the band assembly.

Further to the explanation involving more than one SMA element, FIG. 14 shows band assemblies 66 that include two SMA elements 68 toward the outside of the tire assembly (near the tread) and one bead member 58 toward the inside of the tire assembly (near the rim). FIG. 15 includes exaggerated layering to see a fiber reinforcement member 56 inside the polymer member 70 and extending around the outer surfaces 68a and 58a of the first and second SMA elements 68 and the bead member 58. As shown in FIG. 15, the fiber reinforced polymer assembly may include an extension portion 72 that extends inwardly and between the first and second SMA elements 68 to prevent the SMA elements from rubbing together. FIG. 16 shows band assemblies 74 that include three SMA elements 76 toward the outside of the tire assembly (near the tread) and one bead member 58 toward the inside of the tire assembly (near the rim). In this arrangement, a portion of the fiber reinforced polymer assembly 78 extends from the bead member 58 upwardly at an angle, which provides a lateral force component that helps with cornering and the like. Therefore, if the tire assembly is longitudinally bisected by a plane (e.g., the plane extends up and down with respect to the ground), the right and left sides of the fiber reinforced polymer assembly 78 extend upwardly at an angle that is non-parallel to the plane. This provides a lateral or horizontal component to the tension provided by the fiber reinforced polymer assembly 78 It will be appreciated that in FIGS. 14 and 16, the detail of a number of the components, including the SMA elements, belt 60, fiber reinforced polymer assemblies and bead members 58 behind the cut line are not shown and are omitted so as to not complicate the drawings.

In a preferred embodiment, the polymer in the fiber reinforced polymer assemblies is adhered to the outer surface of the bead member(s) and SMA elements to form the band assembly. Furthermore, the fiber reinforced polymer assemblies may be cured such that the adjacent the fiber reinforced polymer assemblies are adhered or otherwise secured together. The fiber reinforcements may spiral around the bead member(s) and SMA elements (within the polymer strip, band or ply) over the 360° of the tire assembly.

Figure 18:
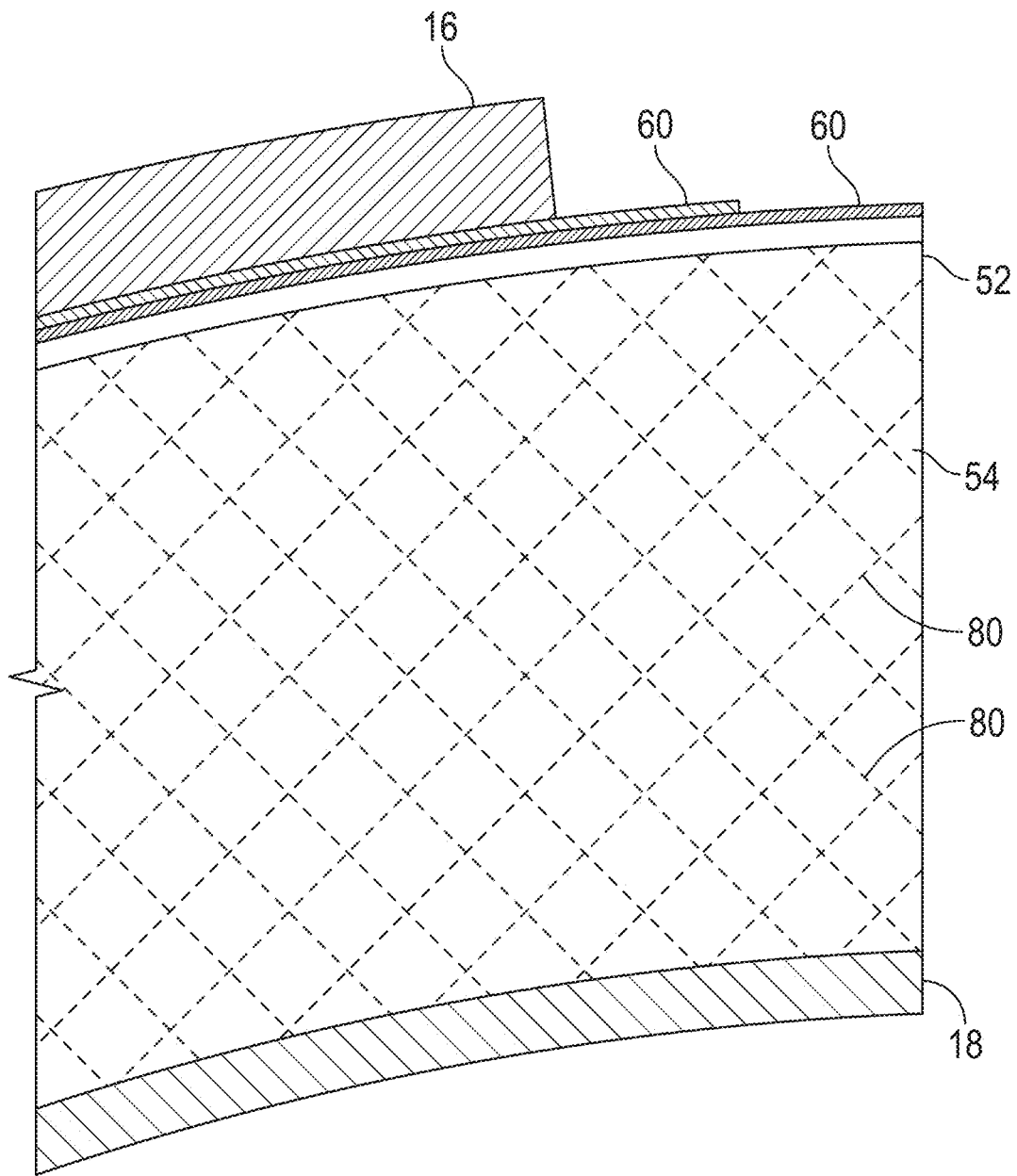
FIG. 18 is a side elevational cross-sectional view of a portion of the tire assembly showing the band assembly with a bias ply arrangement.

It will be appreciated that each fiber reinforced polymer assembly may include multiple layers or plies, each with fiber reinforcement members therein. Furthermore, in any of the ply layers or the polymers, the fiber reinforcement members or cords may extend or run at an angle, as opposed to radially, as is shown in most of the drawings. FIG. 18 shows two sets of fiber reinforcement members 80 extending at opposite angles to one another (e.g., 45 degrees one way and 45 degrees the other way). These oppositely extending fiber reinforcement members 80 may be in the same polymer layer or may be in separate ply layers (e.g., one ply or layer with plus 30 degree cords and another ply or layer with negative 30 degree cords, which may be referred to as a bias ply. The fiber reinforcement members may extend radially (FIG. 11) or at any angle up to 90 degrees (which is essentially extending circumferentially).

In use, the present invention includes an outer ring of circumferentially wrapped SMA elements that are designed to engage when the tire assembly is loaded. In use, the SMA elements are designed to absorb the majority of the load. It will be appreciated by those of ordinary skill in the art that the SMA elements use a unique combination of strength, recoverability, and return energy to increase tire performance.

Another component of the invention is the fiber reinforced polymer assembly 53 used to create a rigid attachment between the SMA elements 52 and the tire bead elements or members 58 and/or the rim 18. During loading, the SMA elements 52 deflect to generate a footprint. The diameter of the remaining SMA elements attempts to grow to accommodate the shortened chord length of the footprint section. The fiber reinforced polymer assembly 53 restricts the growth of the outer diameter through the semi-rigid fiber reinforcements 56 wrapped around the SMA elements 52 to the tire bead elements or members 58 and/or the rim 18. This effectively distributes the load to the entire band assemblies 55, rather than just the SMA elements at the footprint, resulting in an efficient usage of the SMA material and improved tire performance. As load is placed on the axle, the SMA elements at or near the outer diameter (OD) of the tire assembly deflect to generate the footprint. Since the circumference is shorter due to the cord length of the footprint, the circumferential tube formed by the SMA elements attempts to grow radially outwardly and/or outside the footprint. The reinforcement fibers 56 extending between and attaching the rim/beads and the SMA elements restricts the OD growth, therefore generating a semi-rigid body similar to a pneumatic tire.

The tire belt(s) 60 are used to support tire assembly performance with added lateral strength. They help maintain ideal tire shape during usage. However, the tire belt(s) may be omitted. The tire bead members 58 allow the tire to stay seated on the rim, similar to its purpose in conventional pneumatic tires. However, without the need for tight seals (in tubeless pneumatic tires), additional improvements can be made to the tire bead.

The tread 16 serves a similar purpose as in conventional pneumatic tires. This is the section of the tire that comes in contact with the road. The tread is used to ensure good contact and allow water to escape during poor weather conditions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 16, other aspects may likewise be embodied as a means-plus-function claim, or in other forms, such as being embodied in a computer-readable medium. (Any claims intended to be treated under 35 U.S.C. § 112, 16 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A tire assembly comprising:
a tread portion,
a rim, and
at least a first band assembly positioned between the tread portion and the rim, wherein the first band assembly includes
a first SMA element having an outer surface, wherein the first SMA element extends circumferentially about the tire assembly,
a first bead member having an outer surface, wherein the first bead member extends circumferentially about the tire assembly, and
a plurality of fiber reinforcement members, wherein each of the plurality of fiber reinforcement members extend around the outer surface of the first SMA element and the outer surface of the first bead member to form the first band assembly.

2. The tire assembly of claim 1 wherein the plurality of fiber reinforcement members extend circumferentially about the tire assembly.

3. The tire assembly of claim 1 wherein the plurality of fiber reinforcement members are disposed in a first polymer member to form a fiber reinforced polymer assembly, wherein the fiber reinforced polymer assembly extends around the outer surface of the first SMA element and the outer surface of the first bead member.

4. The tire assembly of claim 3 wherein the fiber reinforced polymer assembly comprises a tubular configuration that extends circumferentially about the tire assembly.

5. The tire assembly of claim 3 wherein the fiber reinforced polymer assembly comprises a wrapped spiral configuration that extends circumferentially about the tire assembly.

6. The tire assembly of claim 3 wherein the fiber reinforced polymer assembly includes first and second polymer members, wherein the first polymer member includes a first set of fiber reinforcement members disposed therein, wherein the second polymer member includes a second set of fiber reinforcement members disposed therein, wherein the first set of fiber reinforcement members extend in a first direction, wherein the second set of fiber reinforcement members extend in a second direction, and wherein the first direction is non-parallel to the second direction.

7. The tire assembly of claim 3 wherein the band assembly includes a second SMA element having an outer surface, wherein the second SMA element extends circumferentially about the tire assembly, wherein the fiber reinforced polymer assembly extends around the outer surface of the first SMA element, the outer surface of the second SMA element and the outer surface of the first bead member.

8. The tire assembly of claim 7 wherein the first SMA element is positioned laterally adjacent to the second SMA element.

9. The tire assembly of claim 8 wherein the fiber reinforced polymer assembly includes an extension portion that extends inwardly and between the first and second SMA elements.

10. The tire assembly of claim 1 further comprising at least a second band assembly positioned between the tread portion and the rim and positioned laterally adjacent to the first band assembly, wherein the second band assembly includes
a first SMA element having an outer surface, wherein the first SMA element extends circumferentially about the tire assembly,
a first bead member having an outer surface, wherein the first bead member extends circumferentially about the tire assembly, and
a plurality of fiber reinforcement members, wherein each of the plurality of fiber reinforcement members extend around the outer surface of the first SMA element and the outer surface of the first bead member to form the first band assembly.

11. The tire assembly of claim 1 wherein an inner portion of the first band assembly is seated in a groove associated with the rim.

12. A tire assembly comprising:
a tread portion,
a rim, and
at least a first band assembly positioned between the tread portion and the rim, wherein the first band assembly includes
a first SMA element having an outer surface, wherein the first SMA element extends circumferentially about the tire assembly,
a second SMA element having an outer surface, wherein the second SMA element extends circumferentially about the tire assembly and is positioned laterally adjacent to the first SMA element,
a first bead member having an outer surface, wherein the first bead member extends circumferentially about the tire assembly, and
a first fiber reinforced polymer assembly that includes a plurality of fiber reinforcement members disposed in a polymer member, wherein the first fiber reinforced polymer assembly extends around the outer surface of the first SMA element, the outer surface of the second SMA element and the outer surface of the first bead member, wherein the first fiber reinforced polymer assembly extends circumferentially about the tire assembly.

13. The tire assembly of claim 12 further comprising at least a second band assembly positioned between the tread member and the rim and positioned laterally adjacent to the first band assembly, wherein the second band assembly includes a first SMA element having an outer surface, wherein the first SMA element extends circumferentially about the tire assembly, a first bead member having an outer surface, wherein the first bead member extends circumferentially about the tire assembly, and a first fiber reinforced polymer assembly that includes a plurality of fiber reinforcement members disposed in a polymer member, wherein the first fiber reinforced polymer assembly extends around the outer surface of the first SMA element, the outer surface of the second SMA element and the outer surface of the first bead member, wherein the first fiber reinforced polymer assembly extends circumferentially about the tire assembly.

\* \* \* \* \*